UNITED STATES PATENT OFFICE.

MARTIN DODSWORTH, OF DETROIT, MICHIGAN, ASSIGNOR TO NELSON, BAKER & CO., OF DETROIT, MICHIGAN, A CORPORATION OF MICHIGAN.

ANTISEPTIC ORGANIC-SILVER COMPOUND.

No. 900,835.  Specification of Letters Patent.  Patented Oct. 13, 1908.

Application filed April 4, 1908. Serial No. 425,179. (Specimens.)

*To all whom it may concern:*

Be it known that I, MARTIN DODSWORTH, a subject of the King of Great Britain and Ireland, residing at Detroit, in the county of Wayne and State of Michigan, have invented certain new and useful Improvements in Antiseptic Organic-Silver Compounds, of which the following is a specification, reference being had therein to the accompanying drawings.

The invention relates generally to antiseptic compounds, and consists in a new substance of this character having powerful antiseptic and germicidal properties, but differing materially from similar known compounds of this class, in being practically a non-irritant, the substance being particularly useful for the treatment of affections of the eye, as trachoma, and suppuration of the inner ear. It is derived from a soluble salt of silver, preferably the nitrate, ammonia and formaldehyde in the proportions and amounts as hereinafter set forth, and is expressed in its preferred form by the symbol:

$$(CH_2)6N_4NO_2OAg.$$

It may be prepared by adding to one volume of a 40% solution of formaldehyde two volumes of a 10% solution of ammonia. This mixture is then allowed to stand an hour or two to permit the chemical union to be effected, and is subsequently evaporated to expel any excess of ammonia. The soluble silver salt,—preferably the nitrate,—is then gradually added as long as a precipitate is produced.

The reaction which takes place is as follows:

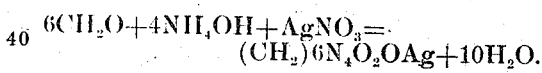

$$6CH_2O + 4NH_4OH + AgNO_3 =$$
$$(CH_2)6N_4O_2OAg + 10H_2O.$$

Thus, 180 parts by weight of absolute formaldehyde yield 308 parts of the new product, which is a crystalline substance of lustrous whiteness. The precipitate is collected, washed carefully with distilled water and dried *in vacuo* in a place from which actinic rays of light are excluded.

The compound is soluble in 500 parts of water at 25° C., and is insoluble in alcohol, chloroform and ether. At 192° C. it darkens, and at approximately 197° C. it decomposes, giving off a gas with a disagreeable, herring-brine odor. Heated with diluted sulfuric acid, it is decomposed with the liberation of formaldehyde. When heated at a white heat in a porcelain crucible, silver is left behind, which can be identified by the usual tests. If 0.1 gm. of the compound be mixed with 0.1 gm. of salicylic acid and 5 cc. of sulfuric acid, and then heated moderately, a carmine-red color should be produced.

The percentage composition of the compound is as follows: carbon, 23.18 per cent.; oxygen, 15.48 per cent.; hydrogen, 3.89 per cent.; nitrogen, 22.63 per cent.; and silver, 34.82 per cent.

What I claim as my invention is,—

1. An antiseptic organic silver compound, derived from a soluble silver salt, ammonia and formaldehyde, which is characterized by a powerful germicide and substantially non-irritant action, is lustrous white in color, has the form of acicular crystals, is substantially odorless, is sparingly soluble in water and insoluble in alcohol, chloroform and ether, and decomposes at substantially 197° C.

2. An antiseptic organic silver compound, derived from silver nitrate, ammonia and formaldehyde in substantially the proportions and amounts specified characterized by a powerful germicidal and substantially non-irritant action, is lustrous white in color, substantially odorless, sparingly soluble in water, and insoluble in alcohol, chloroform and ether, and decomposes when heated to 197° C.

In testimony whereof I affix my signature in presence of two witnesses.

MARTIN DODSWORTH

Witnesses:
NELLIE KINSELLA,
JAMES P. BARRY.